United States Patent [19]
Sato

[11] Patent Number: 5,660,081
[45] Date of Patent: Aug. 26, 1997

[54] SYSTEM FOR INDEPENDENTLY OPERATING TWO DRIVEN PORTIONS BY SINGLE OPERATING MEMBER

[75] Inventor: Yoshikazu Sato, Sayama, Japan

[73] Assignee: Honda Giken Kogyo Kabushiki Kaisha, Tokyo, Japan

[21] Appl. No.: 386,359

[22] Filed: Feb. 9, 1995

[30] Foreign Application Priority Data

Feb. 10, 1994 [JP] Japan ................................ 6-016582
Aug. 17, 1994 [JP] Japan ................................ 6-193237

[51] Int. Cl.⁶ .................................................. E05B 53/00
[52] U.S. Cl. ................... 74/502; 74/471 R; 292/DIG. 25
[58] Field of Search ........................... 74/500.5, 471 R, 74/502, 502.4, 502.6; 292/DIG. 25, 141, 171, 225

[56] References Cited

U.S. PATENT DOCUMENTS

| | | | |
|---|---|---|---|
| 3,176,936 | 4/1965 | Howard et al. | 74/471 |
| 3,401,522 | 9/1968 | Hann et al. | |
| 4,374,597 | 2/1983 | Mochida | 74/500.5 |
| 4,480,720 | 11/1984 | Shimano | 74/502.2 |
| 4,526,057 | 7/1985 | Mochida et al. | 74/502.2 |
| 4,702,117 | 10/1987 | Tsutsumi et al. | 74/502.6 |

FOREIGN PATENT DOCUMENTS

| | | |
|---|---|---|
| 100028 A1 | 2/1984 | European Pat. Off. |
| 1625149 | 6/1972 | Germany |
| 92 06 249.0 | 10/1992 | Germany |

OTHER PUBLICATIONS

Letter including Partial Translation of German Patent Publication No. 92 06 249.

*Primary Examiner*—Charles A. Marmor
*Assistant Examiner*—Mary Ann Battista
*Attorney, Agent, or Firm*—Nikaido, Marmelstein, Murray & Oram LLP

[57] ABSTRACT

An operating member and relay operating member are interconnected through a driving cable. Inserted through the relay operating member are an inner cable portion of a first driven cable adapted to engage the relay operating member only upon movement of the latter in one direction, and an inner cable portion of a second driven cable adapted to engage the relay operating member only upon movement of the latter in the other direction. Thus, operating forces alternately applied to the operating member in two directions are efficiently transferred individually to two driven portions through the single driving cable and the two driven cables to reliably operate the driven portions.

11 Claims, 15 Drawing Sheets

SYSTEM FOR INDEPENDENTLY OPERATING TWO DRIVEN PORTIONS BY SINGLE OPERATING MEMBER

BACKGROUND OF THE INVENTION

1. Field of the Invention

The present invention relates to a system for independently operating two driven portions by a single operating member, such as a lock-releasing portion of a trunk lid locking device and a lock-releasing portion of a fuel lid locking device in an automotive vehicle.

DESCRIPTION OF THE PRIOR ART

In the prior art system for independently operating two driven portions by a single operating member, as disclosed, for example, in Japanese Patent Publication No. 52885/1987, when an inner cable portion of a push-pull type driving cable is pushed, a stopper mounted to the inner cable is fixed by abutment against a casing of a relay section, and an outer cable portion of the driving cable is contracted by a reaction thereof, thereby operating a relay operating member in one direction to operate one of the driven portions through one of driven cables. When the inner cable portion of the driving cable is pulled, the inner cable of the other driven cable is directly pulled to operate the other driven cable.

In the above prior art system, the outer cable portion of the driving cable is connected to the relay operating member, and a hollow portion of a relatively larger diameter is provided in the relay operating member for slidably accommodating the stopper mounted on the inner cable portion of the driving cable passed through the relay operating member. For this reason, the above prior art system suffers from a disadvantage that during pushing of the inner cable portion, the inner cable portion is buckled at the hollow portion of the relay operating member and as a result, a force is not efficiently transferred to the outer cable portion of the driving cable, thereby causing an operational lag in the relay operating member.

SUMMARY OF THE INVENTION

Accordingly, it is an object of the present invention to provide a system for independently operating two driven portions by a single operating member, wherein pushing and pulling forces for the inner cable portion of the driving cable can be efficiently transferred to the two driven portions to reliably operate them independently.

To achieve the above object, according to a first aspect and feature of the present invention, there is provided a system for independently operating two driven portions by a single operating member, comprising: an operating member and a relay operating member which are interconnected through a driving cable, such that the relay operating member is operated in opposite directions C and D from a second predetermined neutral position in operative association with the operating member operated in opposite directions A and B from a first predetermined neutral position; first and second driven cables having inner cable portions slidably inserted through the relay operating member for sliding movement in the directions C and D; a first expanded terminal mounted at one end of the inner cable portion for engaging the relay operating member of the first driven cable so as to pull the inner cable portion when the relay operating member is operated in the direction C from the second neutral position; and a second expanded terminal mounted at one end of the inner cable portion of the second driven cable for engaging the operating member so as to pull the inner cable of the second driven cable when the relay operating member is operated in the direction D from the second neutral position, the other ends of the inner cable portions of the first and second driven cables being connected to first and second driven portions which are operated by pulling of the inner cable portions.

With the first feature, the relay operating member is operated in the two opposite directions C and D by pushing and pulling of the inner cable portion of the driving cable and therefore, an operating force can be efficiently transferred from the driving cable to the relay operating member. In addition, the inner cable portions of the first and second driven cables are alternately pulled by the operation of the relay operating member in the directions C and D to independently operate the first and second driven portions and therefore, the operating force of the relay operating member can be also efficiently transferred to the first and second driven cables to reliably operate them.

In addition to the above first feature, according to a second aspect and feature of the present invention, the driving cable is constructed into a push-pull type.

With the second feature, it is possible to transfer the pushing and pulling forces for the inner cable portion of the driving cable directly to the relay operating member to operate the latter without any lag.

In addition to the first feature, according to a further aspect and feature of the present invention, the system further includes a first return spring for applying a biasing force In one direction to the operating member, and a second return spring for applying a biasing force in the other direction to the relay operating member so as to apply a tension to the driving cable, the second return spring having a preset load which is set such that either one of the first and second driven portions can be operated through the relay operating member, when the driving cable is loosed by the operation of the operating member, the first return spring having a preset load which is set larger than that of the second return spring, and a neutral stopper which is mounted on a support for supporting the operating member and which carries a movable end of the first return spring at the first predetermined neutral position of the operating member.

With the further feature, a relatively inexpensive usual Bowden cable can be used as the driving cable. The operating member and relay operating member can be retained at the predetermined neutral positions by cooperation of the first and second return springs, and pushing and pulling forces of the operating member for the driving cable can be transferred to the relay operating member by cooperation with the second return spring to operate the relay operating member.

The above and other objects, features and advantages of the invention will become apparent from the following description of the preferred embodiments taken in conjunction with the accompanying drawings.

BRIEF DESCRIPTION OF THE DRAWINGS

FIG. 12 is a perspective view of the entire structure of an operating system according to a fifth embodiment of the present invention;

DESCRIPTION OF THE PREFERRED EMBODIMENTS

The present invention will now be described by way of preferred embodiments with reference to the accompanying drawings.

Figure 1:
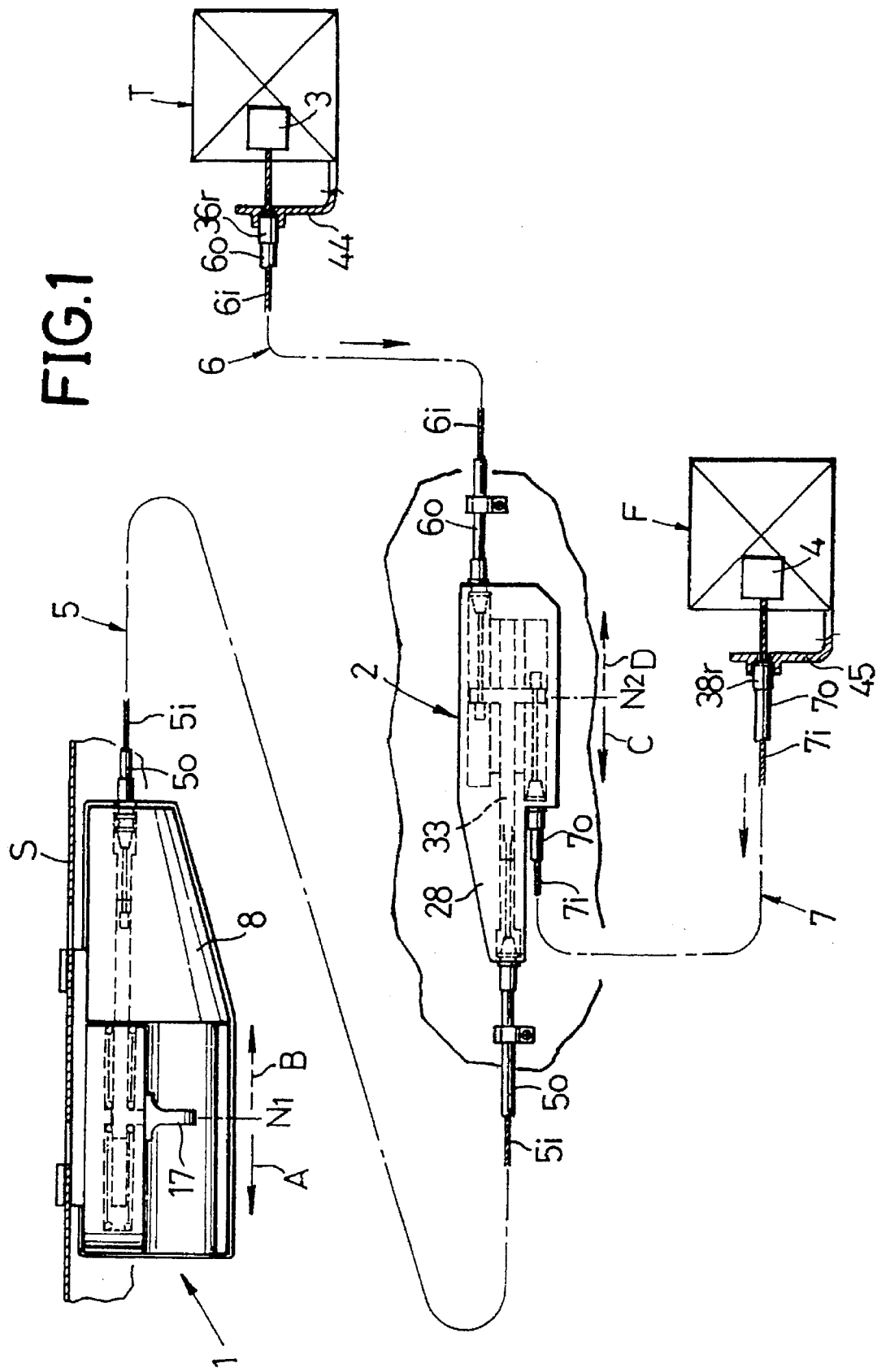
FIG. 1 is a plan view of the entire structure of an operating system according to a first embodiment of the present invention.

Referring first to FIGS. 1 to 8, there is shown a first embodiment of the present invention. As shown in FIG. 1, an operating section 1 and a relay section 2 are interconnected by a push-pull type driving cable 5 having an inner cable portion of a relatively large buckling strength. The relay section 2 is connected to first and second driven portions 3 and 4 through first and second Bowden driven cables 6 and 7, respectively.

This embodiment is applied to an automotive vehicle. The operating section 1 is disposed adjacent driver's seat, so that the operating section 1 can easily be operated by a driver. The first driven portion 3 serves as a lock-releasing portion in a trunk lid locking device T, and the second driven portion 4 serves as a lock-releasing portion in a fuel lid locking device F.

Figure 2:
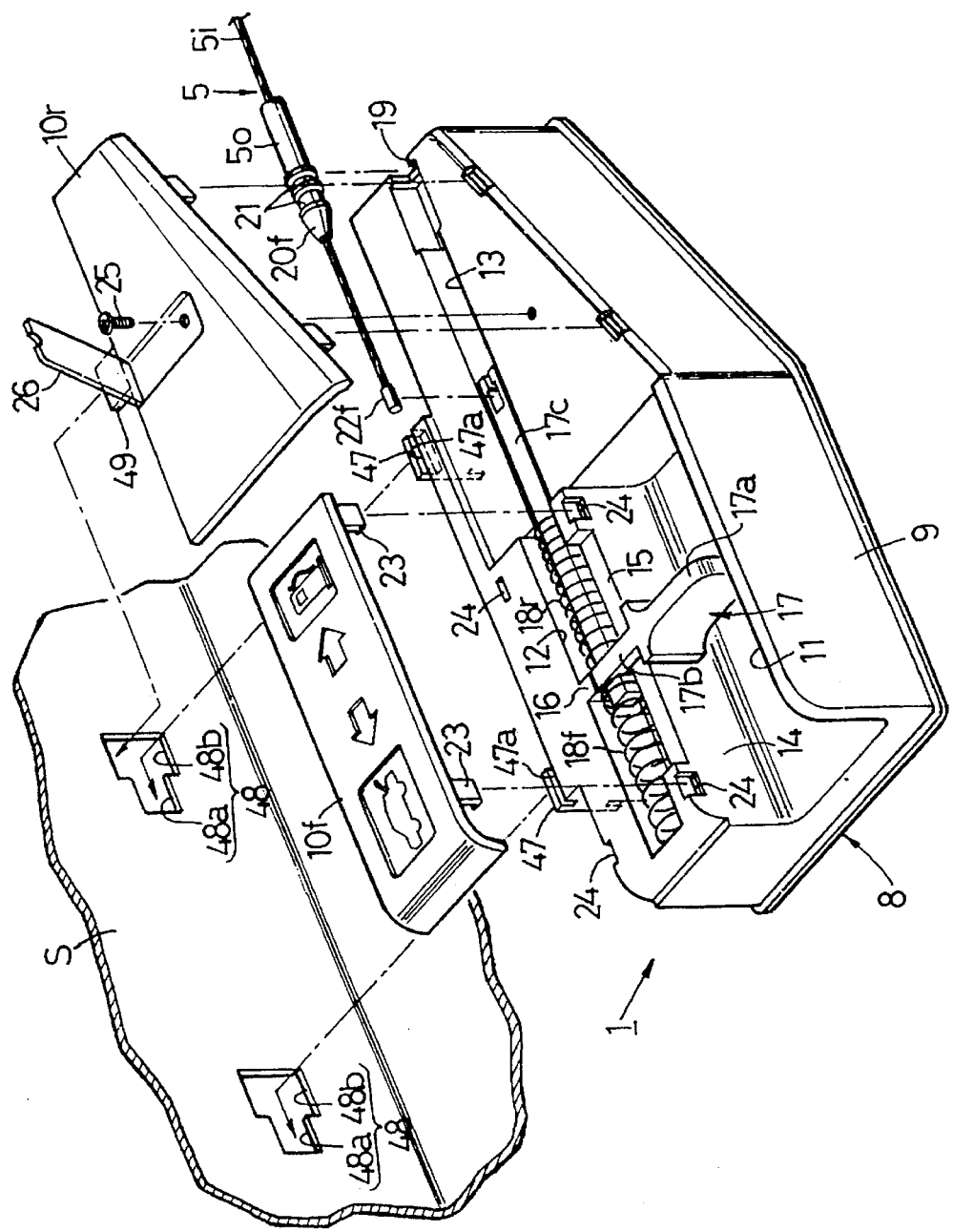
FIG. 2 is an exploded perspective view of an operating section shown in FIG. 1.
Figure 3:
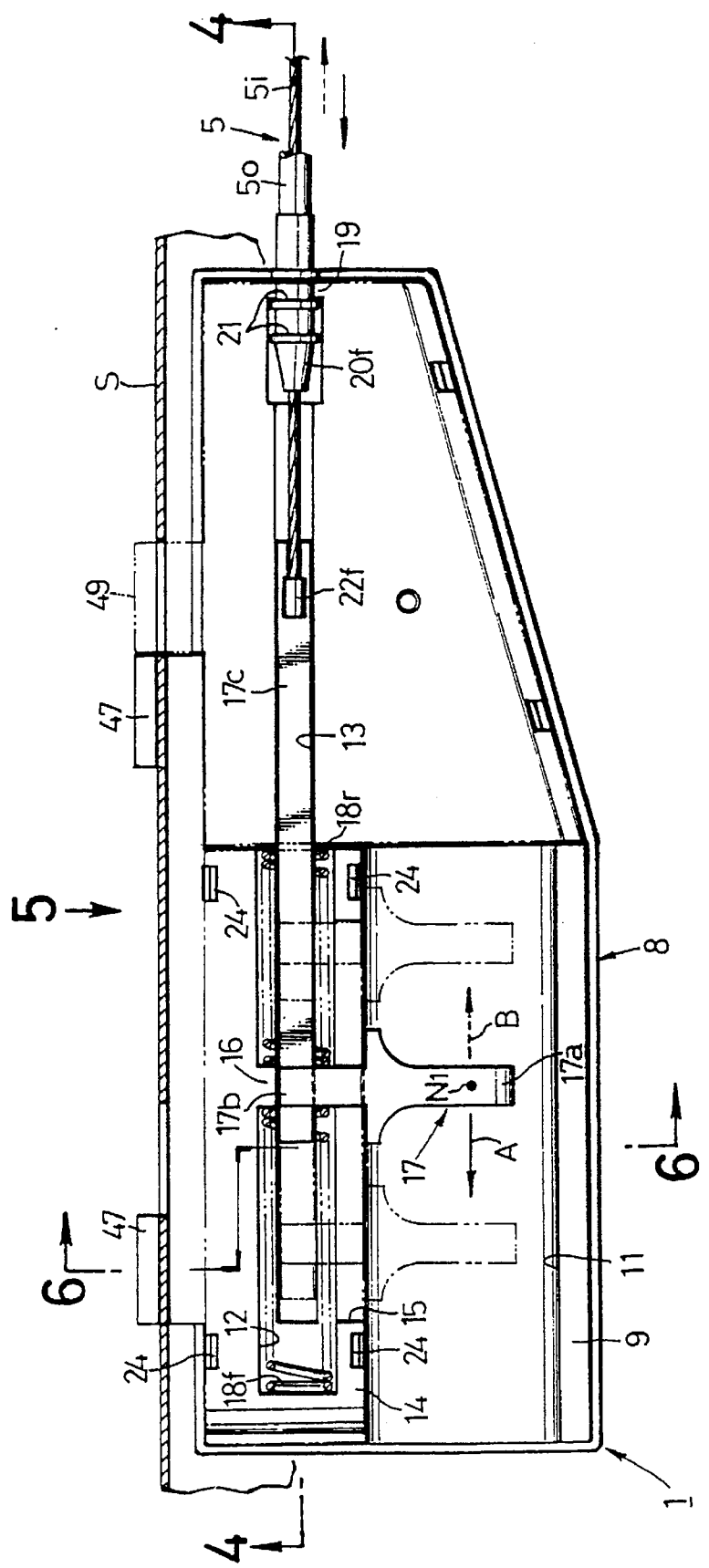
FIG. 3 is a plan view of the operating section with a casing lid opened.
Figure 4:
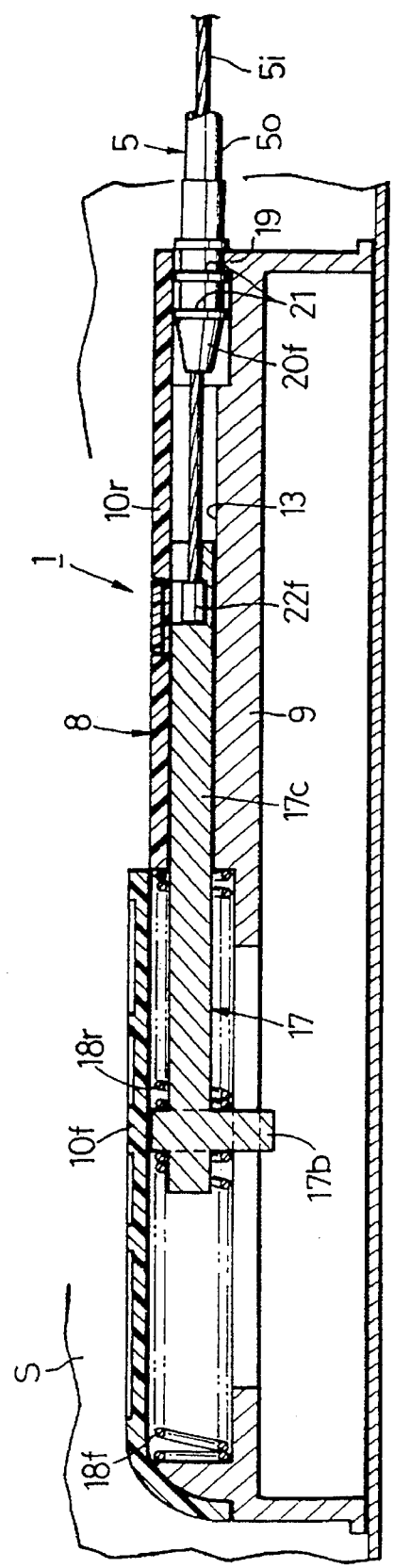
FIG. 4 is a sectional view taken along a line 4—4 in FIG. 3.

As shown in FIGS. 2 to 4, the operating section 1 has a casing 8 which includes a casing body 9 of synthetic resin and front and rear lids 10f and 10r also made of synthetic resin. These lids 10f and 10r are joined to an upper surface of the casing body 9. The casing body 9 is provided at its upper surface with a first wide guide groove 11 extending in a longitudinal direction of a vehicle body, a second narrow guide groove 12 adjacent and parallel to the first guide groove 11 with a partition wall interposed therebetween, and a third narrower groove 13 coaxially extending from a rear end of the second guide groove 12. The partition wall 14 is provided with a notch 15 which interconnects the first and second guide grooves 11 and 12. A neutral positioning projection 16 is provided at a longitudinally central portion of the second guide groove 12 in such a manner to protrude from the inner wall of the groove 12 opposed to the partition wall 14.

An operating member 17 in the operating section 1 includes a knob 17a, a hook-like spring shoe 17b projectingly provided at one end of the knob 17a, and a slidable rod 17c protectingly provided on one side of the spring shoe 17b. The knob 17a is accommodated into the first guide groove 11; the spring shoe 17b is accommodated into the second guide groove 12 via the notch 15, and the slidable rod 17c is accommodated into the third guide groove 13 via the second guide groove 12. Further, a pair of front and rear return springs 18f and 18r are accommodated into the second guide groove 12 for biasing the spring shoe 17b toward a position opposed to the neutral positioning projection 16, i.e., a neutral position $N_1$. The operating member 17 is operated from the neutral position $N_1$ in forward and rearward two directions A and B of the vehicle body.

An inwardly-directed locking collar 19 is formed at a rear open edge of the third guide groove 13. A plurality of annular grooves 21, 21 are defined in an end sleeve 20f fixedly mounted at a front end of an outer cable portion 5o of the driving cable 5. The front end of the outer cable portion 5o is fixed to the casing body 9 by engagement of one of the annular grooves 21, 21 with the locking collar 19. An expanded terminal 22f is fixedly mounted at a front end of the inner cable portion 5i of the driving cable 5 and connected to a rear end of the slidable rod 17c.

As shown in FIGS. 2 and 3, the front lid 10f is for closing an upper open surface of the second guide groove 12 and has a plurality of locking claws 23 protruding downwardly. Thus, the front lid 10f is detachably joined to the casing body 9 by resilient engagement of the plurality of locking claws 23 with a plurality of locking bores 24 in an upper surface of the casing body 9.

The other rear lid 10r is for closing an upper open surface of the third groove 13 and is detachably joined to the upper surface of the casing body 9 by a machine screw 25. A decorative lid 26 covering the machine screw 25 after threaded fitting of the machine screw 25 is integrally formed on the rear lid 10r by molding for covering the machine screw 25".

The casing 8 formed in this manner is mounted to a side sill S of the vehicle body adjacent the driver's seat. The structure of mounting of the casing 8 will be described below.

Figure 7:
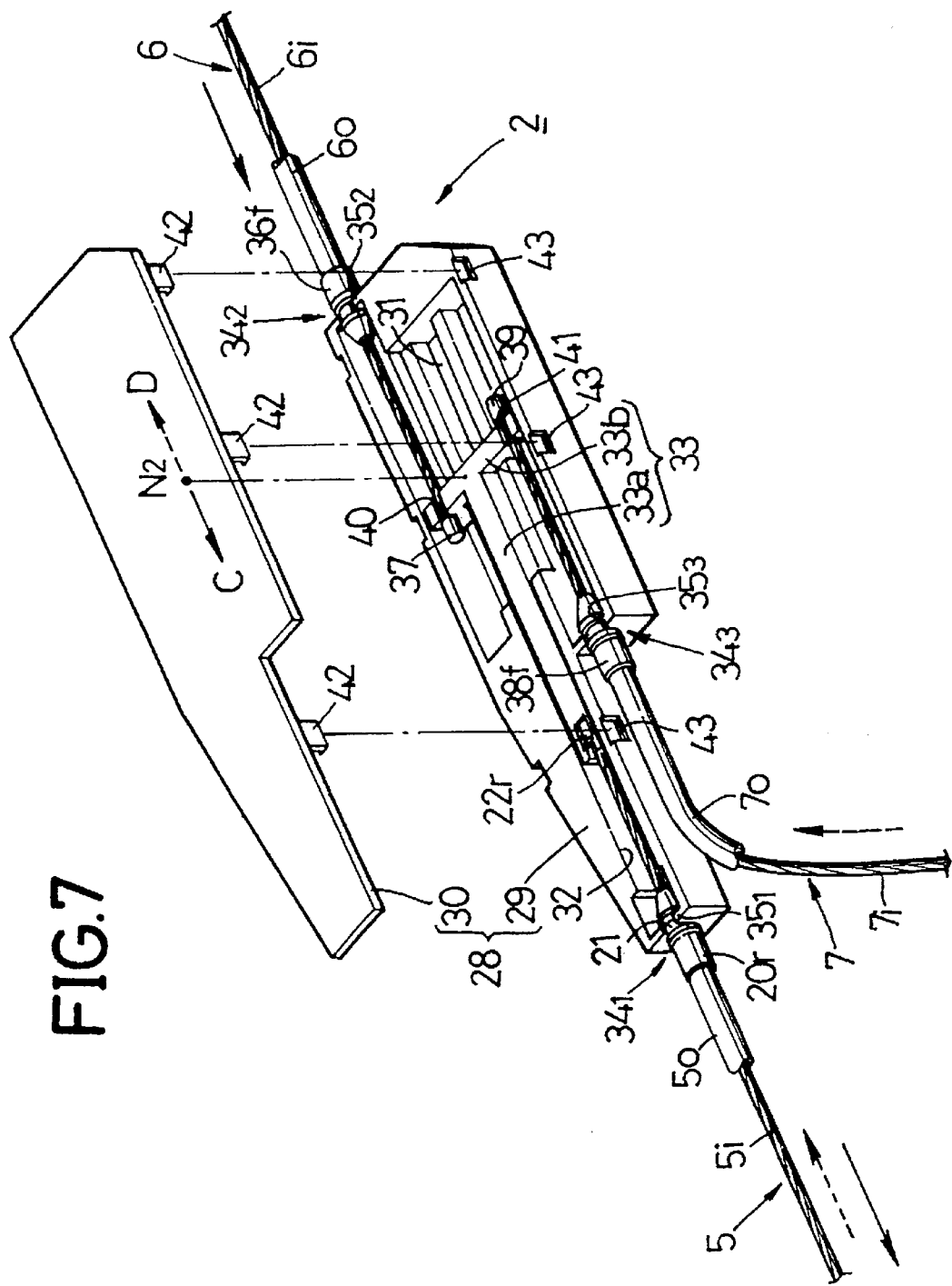
FIG. 7 is an exploded perspective view of a relay section shown in FIG. 1.
Figure 8:
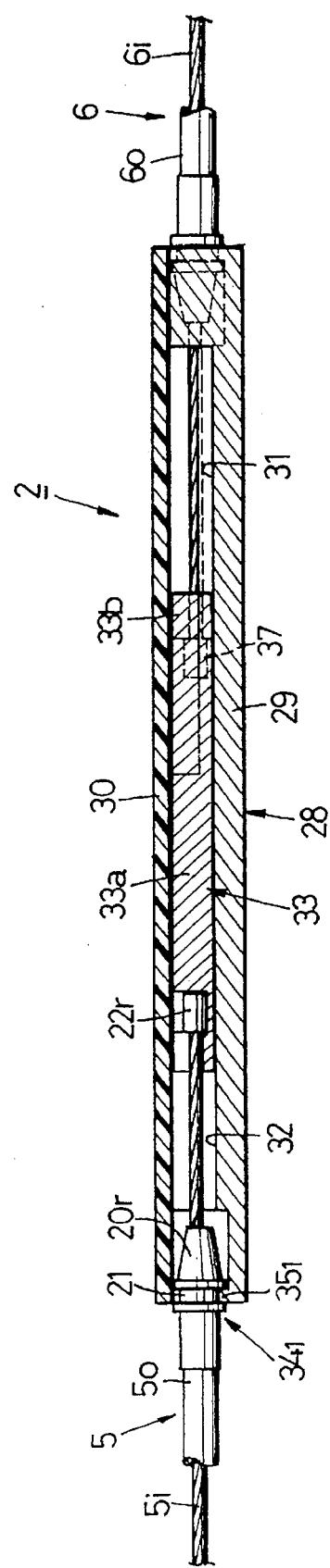
FIG. 8 is a longitudinal sectional side view of the relay section.

Referring to FIGS. 7 to 8, a casing of the relay section 2, i.e., a relay casing 28 includes a casing body 29 and a lid plate 30 joined to an upper surface of the casing body 29. The casing body 29 is provided with a rectangular operating chamber 31 having an opened upper surface, and a guide groove 32 extending from one longitudinal end of the operating chamber 31. A relay operating member 33 is accommodated in the casing body 29 and formed into a T-shape from a relatively long shaft portion 33a and a relatively short arm 33b integrally connected at right angles to one end of the shaft portion 33a. The shaft portion 33a is slidably fitted into the guide groove 32, and the arm 33b is accommodated in the operating chamber 31.

The casing body 29 is also provided with a first insertion hole $34_1$ connected to the guide groove 32, a second insertion hole $34_2$ which opens into the operating chamber 31 on the opposite side from the insertion hole $34_1$, and a third insertion hole $34_3$ which opens into the operating chamber 31 at a location diagonal to the second insertion hole $34_2$. Locking collars $35_1$, $35_2$ and $35_3$ are formed at edges of these insertion holes, respectively.

An end sleeve 20r mounted at the rear end of the outer cable portion 5o of the driving cable 5 is locked to the locking collar $35_1$ of the first insertion hole $34_1$, and an expanded terminal 22r mounted at the rear end of the inner cable portion 5i is connected to a tip end of the shaft portion 33b. When the relay operating member 33 is pulled by the inner cable portion 5i of the driving cable 5, it can be moved from a neutral position $N_2$ in a direction C. When relay operating member 33 is pushed by the inner cable portion 5i, it can be moved from the neutral position $N_2$ in a direction D opposite from the direction C.

An end sleeve 36f mounted at the front end of the outer cable portion 6o of the first driven cable 6 is locked to the locking collar $35_2$ of the second insertion hole $34_2$, and the inner cable portion 6i is slidably inserted through a through-groove 40 provided at one end of the arm 33b. An expanded terminal 37 is mounted at the front end of the inner cable portion 6i and occupies a position of abutment against or in proximity to one side of the arm 33b, when the relay operating member 33 is in the predetermined neutral position $N_2$.

An end sleeve 38f mounted at the front end of the outer cable portion 7o of the second driven cable 7 is looked to the locking collar $35_3$ of the third insertion hole $34_3$, and the inner cable portion 7i of the second driven cable 7 is slidably inserted through a through-groove 41 which is provided at the other end of the arm 33b. An expanded terminal 39 is mounted at the front end of the inner cable portion 7i and occupies a position of abutment against or in proximity to the other side of the arm 33b, when the relay operating member 33 is in the predetermined neutral position $N_2$.

The neutral position $N_2$ of the relay operating member 33 is adjusted by changing the position of engagement of the end sleeve 20f at the outer cable portion 5o of the driving cable 5 with the locking collar 19. For the purpose of this adjustment, the plurality of annular grooves 21 are provided in the above-described manner around the outer periphery of the end sleeve 20f (see FIG. 3).

The lid plate 30 closes the upper open surfaces of the operating chamber 31 and the guide groove 32 and has a plurality of locking claws 42 protruding downwardly from a peripheral edge thereof. The lid plate 30 is detachably joined to the casing body 29 by resilient engagement of the locking claws 42 into a plurality of locking holes 43 defined in a peripheral edge of the upper surface of the casing body 29.

Referring again to FIG. 1, an end sleeve 36r is mounted at the rear end of the outer cable portion 6o of the first driven cable 6 and fixed to a fixing bracket 44 of the trunk lid locking device T, and the rear end of the inner cable portion 6i of the first driven cable 6 is connected to the lock-releasing portion 3 of the trunk lid locking device T.

In addition, an end sleeve 38r is mounted at the rear end of the outer cable portion 7o of the second driven cable 7 and fixed to a fixing bracket 45 of the fuel lid locking device F, and the inner cable portion 7i of the second driven cable 7 is connected to the lock-releasing portion 4 of the fuel lid locking device F.

Figure 5:
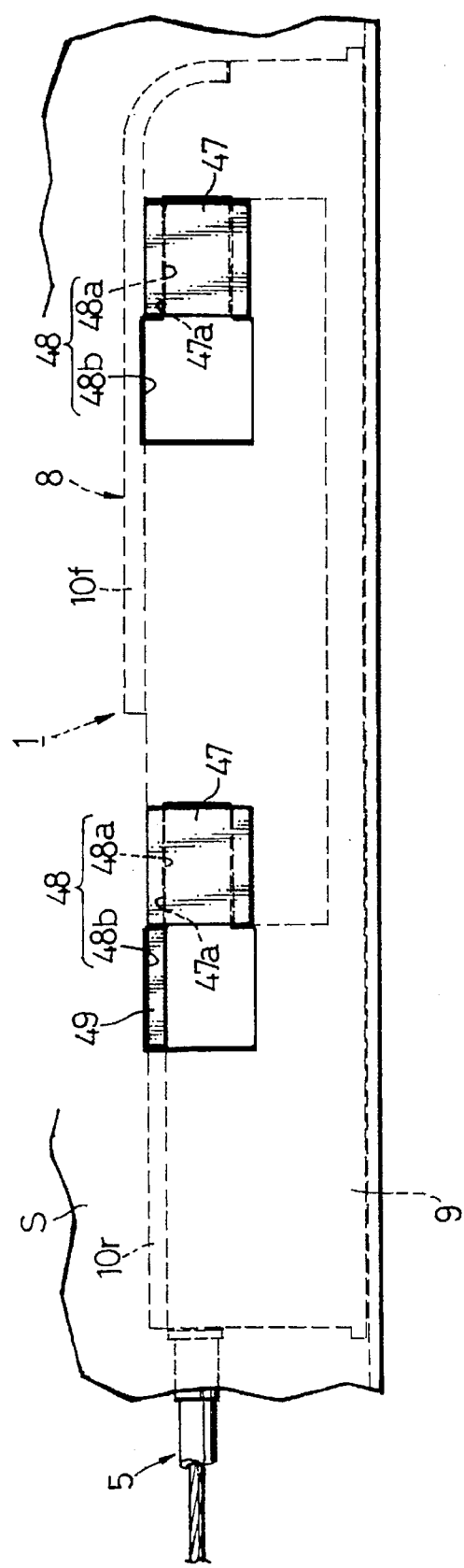
FIG. 5 is a view taken along an arrow 5 in FIG. 3.
Figure 6:
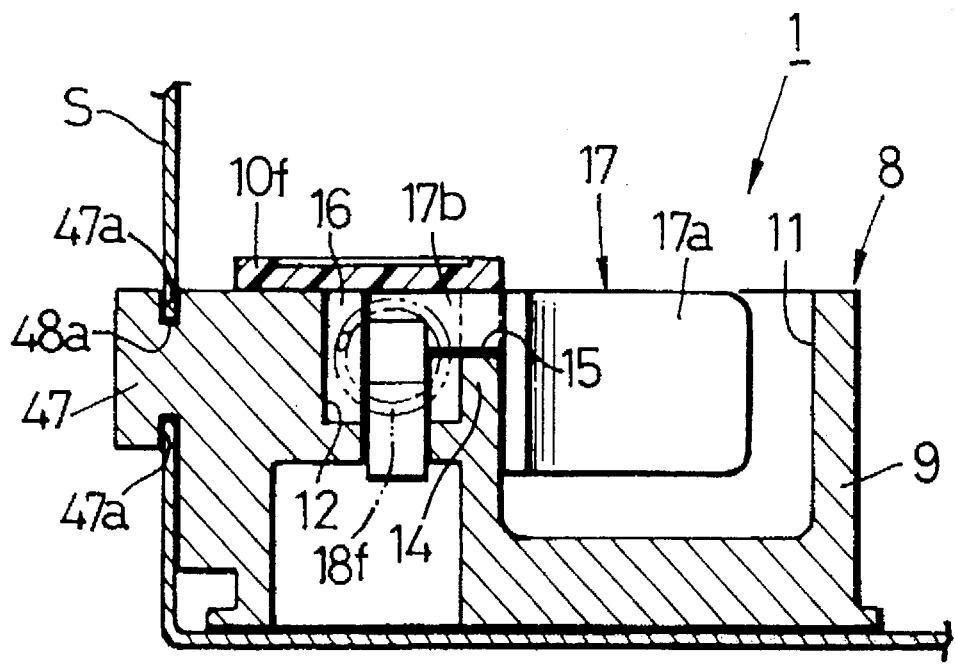
FIG. 6 is a sectional view taken along a line 6—6 in FIG. 3.

The structure of mounting of the casing 8 of the operating section 1 will be described below with reference to FIGS. 3, 5 and 6.

A pair of front and rear mounting bosses 47 are protectingly provided on one side of the casing body 9 and each have, at a base thereof, a pair of upper and lower locking grooves 47a extending in the longitudinal direction of the vehicle body. A stopper piece 49 is provided on one side of the rear lid 10r to protrude in the same direction as the mounting bosses 47.

A pair of front and rear locking holes 48 are provided in the side sill S in correspondence to the mounting bosses 47. Each of the locking holes 48 includes a front narrow portion 48a and a rear wide portion 48b and formed into a T-shape.

Thus, when the mounting bosses 47 are inserted into the corresponding locking holes 48 in a condition in which the rear lid 10r has been removed, and then, the casing body 9 is moved forwardly along an inner surface of the side sill S, upper and lower edges of the narrow portions 48a of the locking holes 48 are brought into engagement with the locking grooves 47a in the mounting bosses 47. Thereafter, the rear lid 10r is secured to the casing body 9 by the machine screw 25 and in this case, the stopper piece 49 is brought into the wide portion 48b of one of the locking holes 48 to abut against the rear end of the mounting boss 47. Thus, the stopper piece 49 inhibits the escape of the mounting boss 47 from the narrow portion 48a and hence, the mounting boss 47 is fixed to the side sill S.

The operation of this embodiment will be described below. When both of the trunk lid locking device T and the fuel lid locking device F are in their locking states, and the operating member 17 of the operating section 1 assumes the shown neutral position $N_1$, the relay operating member 33 in the relay section 2 assumes the neutral position $N_2$, and both of the inner cable portions 6i and 7i of the first and second driven cables 6 and 7 are in their free states. Namely, both of the expanded terminals 37 and 39 of the inner cable portions 6i and 7i are in abutment against, or opposed to the arm 33b of the relay operating member 33 at a very small distance.

If an operator grasps the knob 17a and slides the operating member 17 in the direction A against the force of the front return spring 18f in order to release the locking state of the trunk lid locking device T, the inner cable portion 5i of the driving cable 5 is pulled, thereby causing the relay operating member 33 to be slid in the direction C within the relay casing 28. During this time, the arm 33b of the relay operating member 33 is brought into engagement with the expanded terminal 37 of the inner cable portion 6i of the first driven cable 6 to pull the inner cable portion 6i and hence, the lock-releasing portion 3 of the trunk lid locking device T can be operated to release the locking state of the device T.

The arm 33b of the relay operating member 33 is moved in the direction C away from the expanded terminal 39 of the inner cable portion 7i of the second driven cable 7 and hence, the sliding groove 41 in the arm 33b is only slid relative to the inner cable portion 7i and does not operate the inner cable portion 7i. Therefore, the fuel lid locking device F is still maintained in the locking state.

If the operator releases his or her hand from the operating member 17 after opening of the trunk lid, the operating member 17 is returned to the neutral position $N_1$ by the spring force of the front return spring 18f and in operative association with this returning movement, the relay operating member 33 is also returned to the neutral position $N_2$, thereby causing the lock-releasing portion 3 to push back the inner cable portion 6i by the spring action of a return spring contained therein. If the trunk lid is thereafter closed, the trunk lid locking device T can be automatically operated to maintain the trunk lid in its closed state.

If the operating member 17 is slid by the operator in the direction B against the force of the rear return spring 18r to release the locking state of the fuel lid locking device F, the inner cable portion 5i of the driving cable 5 is pushed to slide the relay operating member 33 in the direction D. Therefore, only the inner cable portion 7i of the second driven cable 7 is pulled in the same manner as that described above, thereby operating the lock-releasing portion 4 in the fuel lid locking device F to release the locking state of the device F. During this time, obviously, the trunk lid locking device T is still maintained in the locking state.

If the operator releases his or her hand from the operating member 17 after opening of the fuel lid, the operating member 17 is returned to the neutral position $N_1$ by the force of the rear return spring 18r and in operative association with this, the relay operating member 33 is also returned to the neutral position $N_2$, thereby causing the lock-releasing portion 4 to push back the inner cable portion 7i by the action of the return spring contained therein. If the fuel lid is then closed, the fuel lid locking device F can be automatically operated to retain the fuel lid in its closed state.

Figure 9:
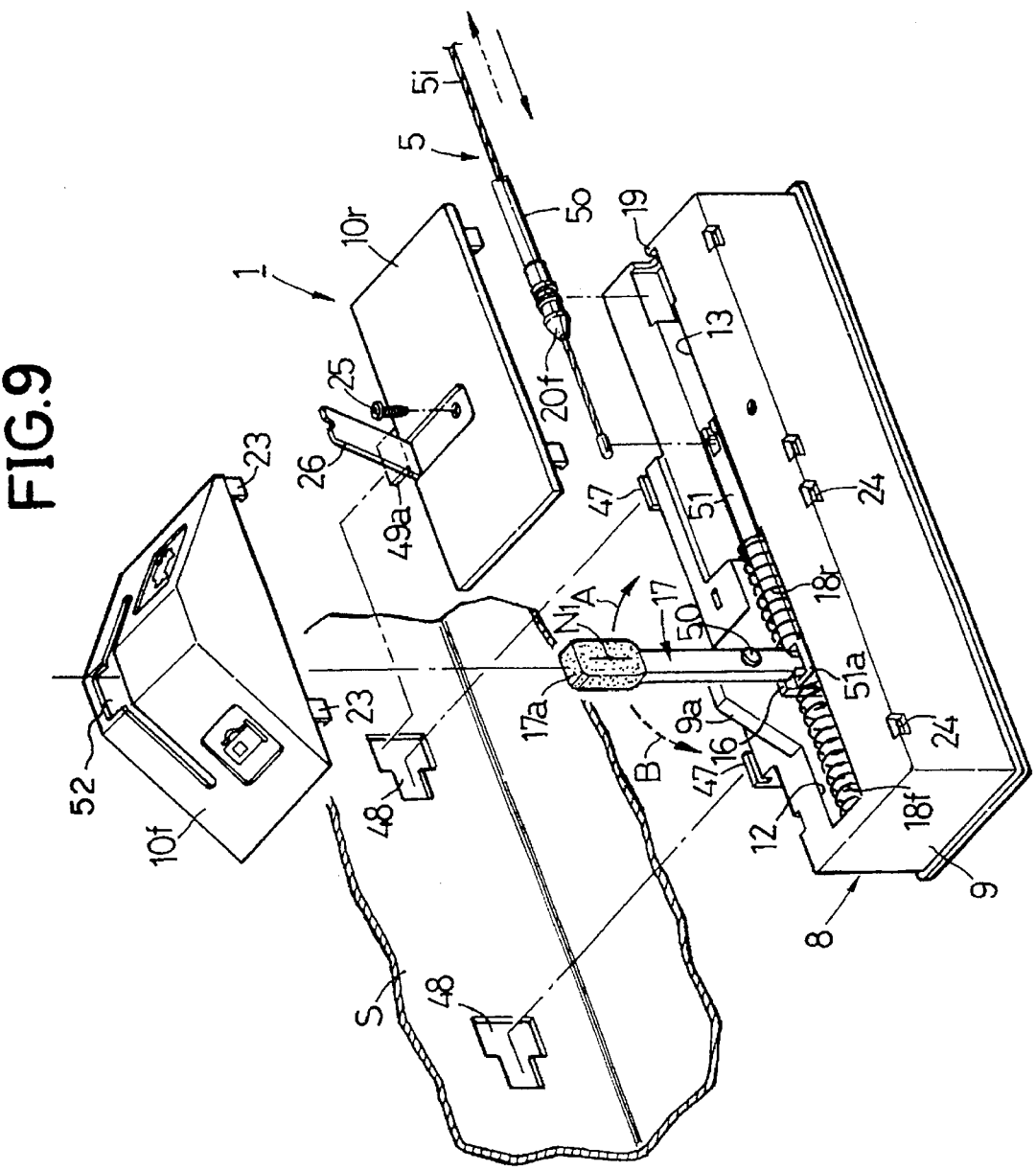
FIG. 9 is an exploded perspective view of an operating section in a second embodiment of the present invention.

FIG. 9 illustrates a second embodiment of the present invention, in which an operating lever 17 is used as an operating member in an operating section 1. The operating lever 17 is supported by a pivot 50 on a bracket 9a projectingly provided on a casing body 9, and a sliding rod 51 is connected to a lower end of the operating lever 17 and accommodated in the guide groove 13 in the casing body 9. The inner cable portion 5i of the driving cable 5 is connected to a tip end of the sliding rod 51. The sliding rod 51 has a spring shoe 51a at its front end. The spring shoe 51a is biased toward the neutral position $N_1$ by a pair of front and rear return springs 18f and 18r in the wide guide groove 12. A front lid 10f is formed into an angle shape so as to be able to cover the operating lever 17 excluding a knob 17a provided at its upper end, and is provided with a slit 52 which permits the turning movement of the operating lever 17. The remaining construction is similar to that in the previously described embodiment, and portions or components corresponding to those in the previous embodiment are designated by like reference characters in FIG. 9.

In this embodiment, the direction A is a rearward direction of the vehicle body, and the direction B is a forward direction of the vehicle body. If the operating lever 17 is turned in the direction A from the neutral position $N_1$, the sliding rod 51 can be moved in a direction opposite from the direction A to pull the inner cable portion 5i of the driving cable 5. Reversely, if the operating lever 17 is turned in the direction B from the neutral position $N_1$, the sliding rod 51 can be moved in a direction opposite from the direction B to push the inner cable 5i. In the operating lever 17, an operating load can be determined at any value by selecting a lever ratio between upper and lower arms bounded by the pivot 50.

Figure 10:
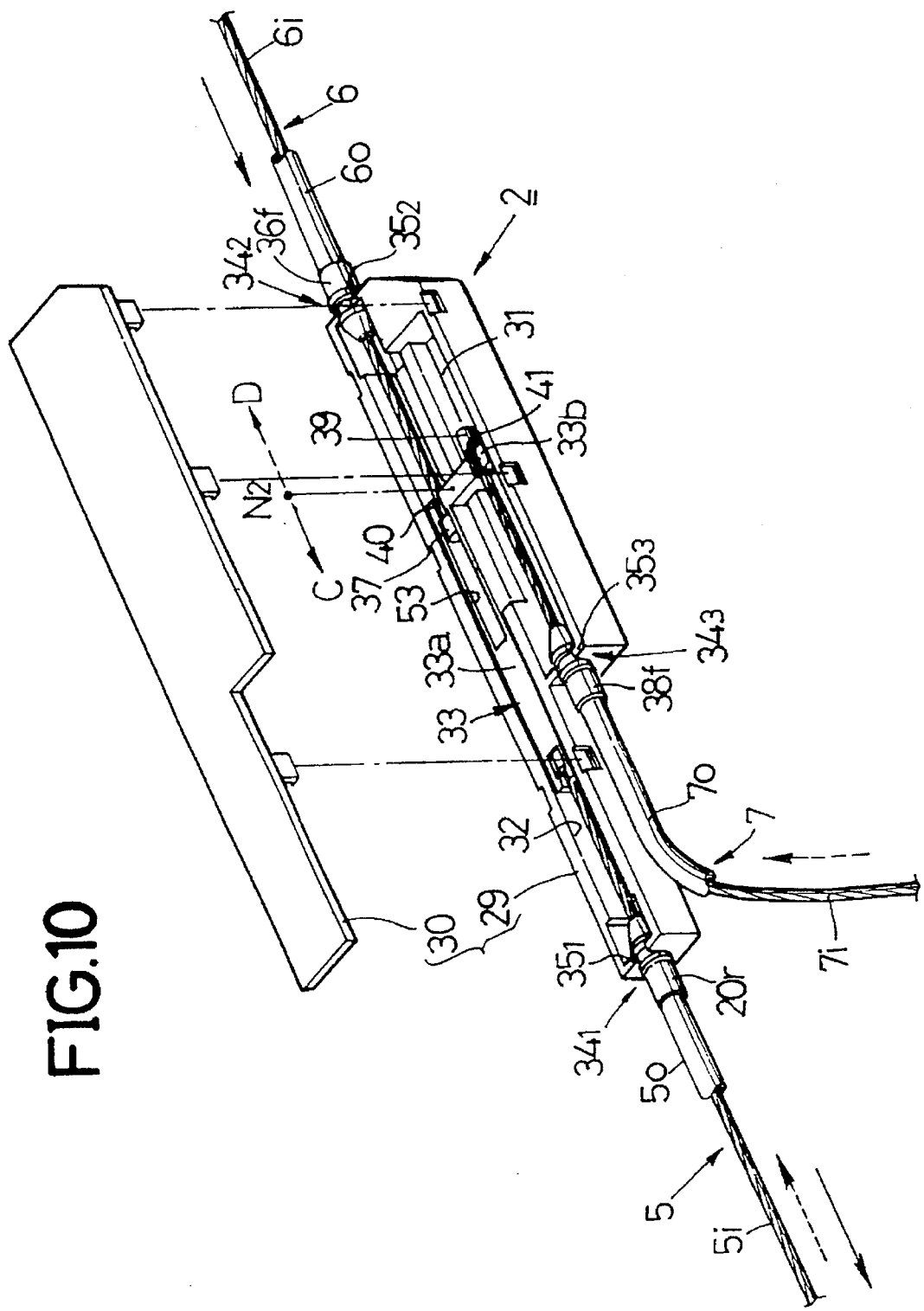
FIG. 10 is an exploded perspective view of a relay section in a third embodiment of the present invention.

FIG. 10 illustrates a third embodiment of the present invention. In a relay section 2, a relay operating member 33 is formed into an L-shape with an arm 33b protruding in one of sideways directions from one end of a shaft portion 33a. The shaft portion 33a is provided with a through-groove 40 which opens into an operating chamber 31 in the casing body 29, and a wide guide groove 53 connected to the through-groove 40. The expanded terminal 37 of the inner cable portion 6i of the first driven cable 6 inserted through the through-groove 40 is slidably accommodated in the guide groove 53. The guide groove 53 has a length which is set at a value such that when the relay operating member 33 is moved in the direction S from the neutral position $N_2$, the expanded terminal 37 does not interfere with the relay operating member 33. The remaining construction is similar to that in the first embodiment and hence, portions or components corresponding to those in the first embodiment are designated by like reference characters.

In this embodiment, the relay casing 28 accommodating the relay operating member 33 can be constructed in a compact manner by shortening the arm 33b of the relay operating member 33.

Figure 11:
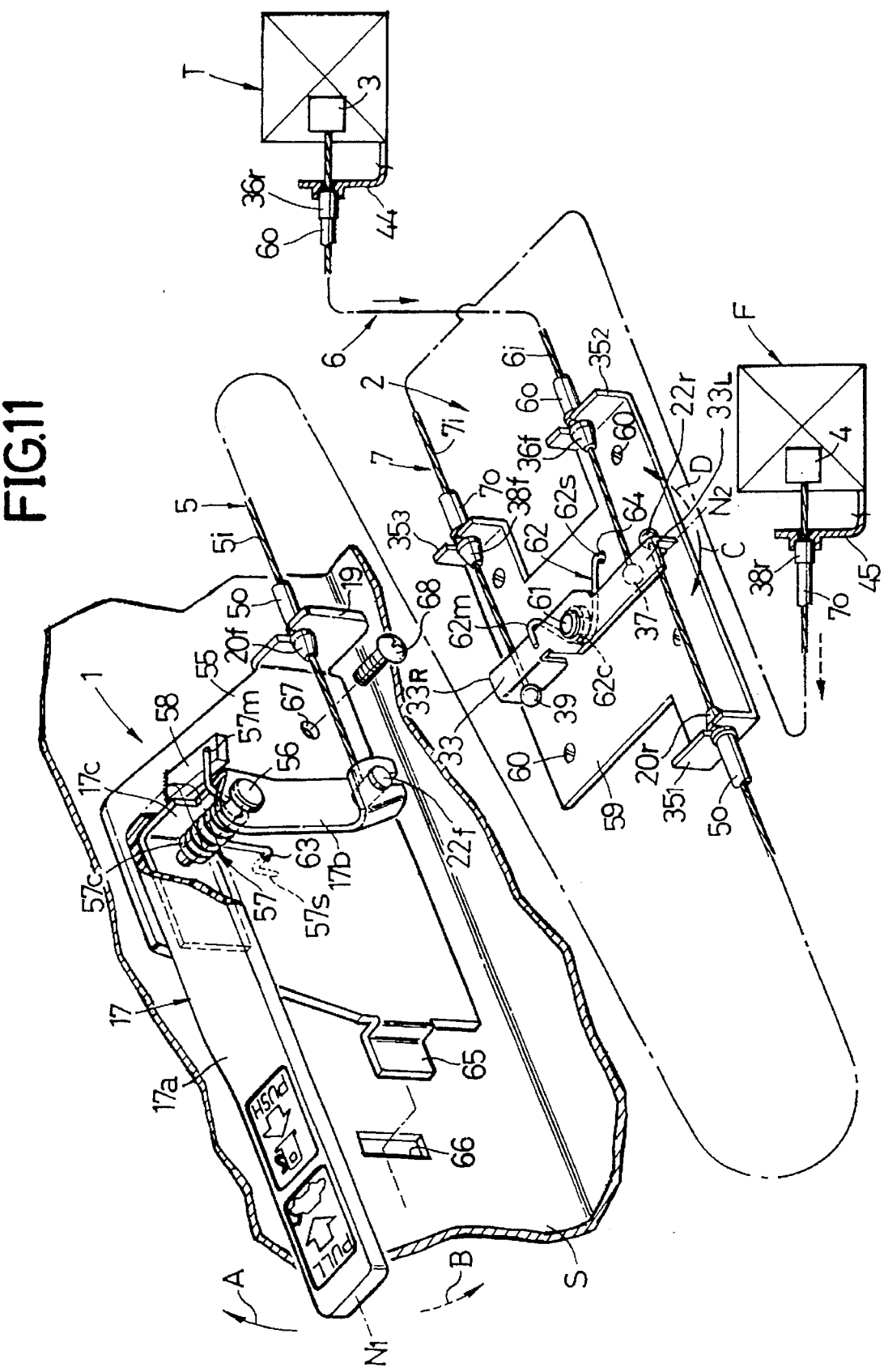
FIG. 11 is a perspective view of the entire structure of an operating system according to a fourth embodiment of the present invention.

FIG. 11 illustrates a fourth embodiment of the present invention. In an operating section 1, a support 55 is secured to the side sill S of the vehicle body by engagement of a locking claw 65 formed at a front end of the support 55 with a locking hole 66 on the side sill S of the vehicle body and screwing a machine screw 68 inserted through a screw bore 67 in a rear portion of the support 55 into the side sill S. An operating lever 17 as an operating member is pivotally mounted on the support 55 by a pivot 56 for rotating movement in the directions A and B from the neutral position $N_1$. An operating member 17 includes a relatively long operating arm 17a extending forwardly from a base portion pivotally supported on the pivot 56, a relatively short operating arm 17b extending downwardly from the base portion, and a connection portion 17c for integrally interconnecting both the arms 17a and 17b behind the pivot 56. A coil portion 57c of a first return spring 57 formed of a torsion coil spring is wound around the pivot 56, so that a fixed end 57s of the spring 57 is locked into a locking hole 63 in the support 55, and a movable end 57m of the spring 57 is movable beyond an upper end of the connecting portion 17c to resiliently abut against an upper surface of a neutral stopper 58 integrally formed on the support 55. When the movable end 57m is in abutment against the upper surface of the neutral stopper 58, the neutral position $N_1$ of the operating lever 17 is defined by abutment of the upper edge of the connecting portion 17c against the movable end 57m.

The driving cable 5 comprises a usual Bowden cable. An expanded terminal 22f at the front end of the inner cable portion 5i of the driving cable 5 is connected to the operating arm 17b, and an end sleeve 20f at the front end of the outer cable portion 5o of the driving cable 5 is locked to a projection piece 19 bent sideways from a rear end of the support 55.

In a relay section 2, a relay lever 33 as a relay operating member is pivotally mounted by a pivot 61 to a relay support 59 secured in place to the vehicle body by a machine screw 60. The lever 33 is pivotable in the directions C and D from the neutral position $N_2$. The relay lever 33 includes left and right arms $33_L$ and $33_R$ which extend in opposite directions from an intermediate portion supported on the pivot 61. An expanded terminal 22r at the rear end of the inner cable portion 5i is connected to a tip end of the left arm $33_L$, and an end sleeve 20r at the rear end of the outer cable portion 5o is locked to a raised piece $35_1$ formed at a front end of the relay support 59. The inner cable portions 6i and 7i of the first and second driven cables 6 and 7 are slidably passed through the left and right arms $33_L$ and $33_R$ of the relay lever 33, and expanded terminals 37 and 39 are fixedly mounted at front ends of the inner cable portions 6i and 7i and adapted to engage front surface of the relay lever 33, when the relay lever 33 assumes the neutral position $N_2$. End sleeves 36f and 38f at the front ends of the outer cable portions 6o and 7o of the first and second driven cables 6 and 7 are locked to a pair of left and right raised pieces $35_2$ and $35_3$ formed at a rear end of the relay support 59, respectively.

A coil portion 62c of a second return spring 62 comprising a torsion coil spring is wound around the pivot 61, so that a fixed end 62s of the spring 62 is locked into a locking hole 64 in the relay support 59, and a movable end 62m of the spring 62 is locked to a rear edge of the right arm $33_R$ of the relay lever 33. Thus, the relay lever 33 is biased for turning movement in a direction to pull the inner cable portion 5i, i.e., in the direction D by the second return spring 62.

In this case, the preset load of the second return spring 62 is set at a magnitude enough to enable the inner cable portion 7i of the second driven cable 7 to be pulled through the relay lever 33, and to enable the lock-releasing portion 4 in the fuel lid locking device F to be operated. The preset load of the first return spring 57 is set at a magnitude larger than that of the second return spring 62.

The remaining construction is substantially similar to that in the first embodiment, and portions or components in FIG. 11 corresponding to those in the first embodiment are designated by like reference characters.

In a free state of the operating lever 17, the movable end 57m of the first return spring 57 is in abutment against the neutral stopper 58, and the second return spring 62 provides a tension to the inner cable portion 5i of the driving cable 5 through the relay lever 33. However, because the preset load of the second return spring 62 is smaller than that of the first return spring 57, the connecting portion 17c of the operating lever 17 is merely urged against a lower surface of the movable end 57m of the first return spring 57 which is in abutment against the neutral stopper 58. As a result, the operating lever 17 is retained at the neutral position $N_l$, and the relay lever 33 is also in the neutral position $N_2$.

If the operating lever 17 is turned in the direction A in order to operate the lock-releasing portion 4 of the trunk lid locking device F in this condition, the inner cable portion 5i of the driving cable 5 is pulled to turn the relay lever 33 in the direction C against the resilient force of the second return spring 62 to pull the inner cable portion 6i of the first driven cable 6, so that the lock-releasing portion 3 can be operated. During this time, the relay lever 33 is merely slid relative to the inner cable portion 7i of the second driven cable 7 and hence, the fuel lid locking device F can be maintained in its locking state.

If the operating lever 17 is turned in the direction B against the resilient force of the first return spring 57 in order to operate the lock-releasing portion 4 of the fuel lid locking device F, the inner cable portion 5i of the driving cable 5 is loosed, so that the relay lever 33 is turned in the direction D under the action of the preset load of the second return spring 62 to pull the inner cable portion 7i of the second driven cable 7 to operate the lock-releasing portion 4. During this time, the relay lever 33 is merely slid relative to the inner cable portion 6i of the first driven cable 6 and hence, the trunk lid locking device T can be maintained in its locking state.

In this embodiment, the usual Bowden cable suffices as the driving cable 5 without use of an expensive push-pull cable and moreover, the two used first and second return springs 57 and 62 suffice. This contributes to a simplification in structure and a reduction in cost.

Figure 12:
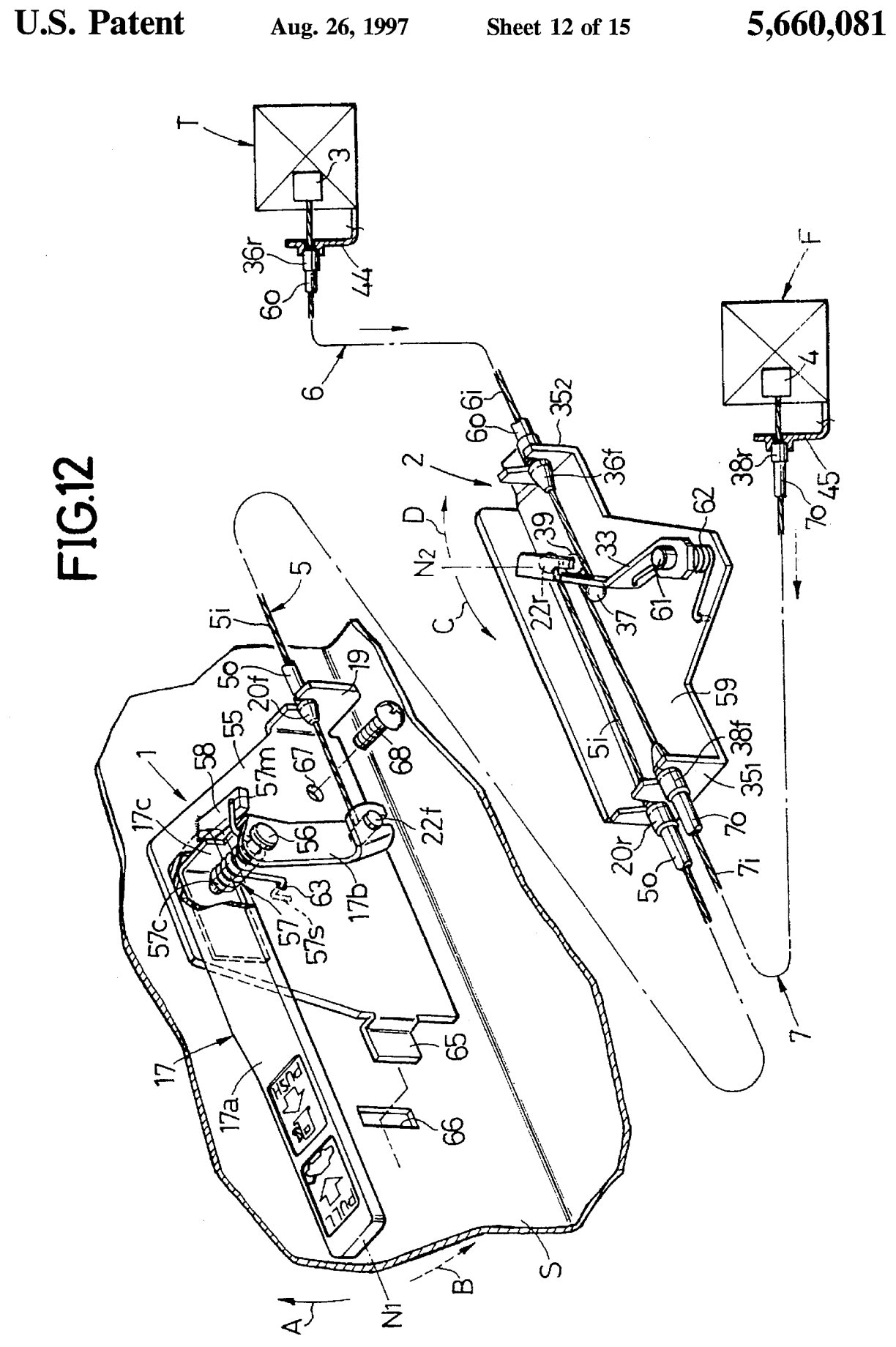

FIG. 12 illustrates a fifth embodiment of the present invention. A relay lever 33 is pivotally mounted at its one end on a relay support 59 in a relay section 2 by a pivot 61 for turning movement in the directions C and D from the neutral position $N_2$.

The end sleeve 20r at the rear end of the outer cable portion 5o of the driving cable 5 comprising Bowden cable is locked to a raised piece $35_1$ of the relay support 59, and the expanded terminal 22r at the rear end of the inner cable portion 5i is connected to the other end, i.e., the free end of the relay lever 33.

The end sleeves 36f and 38f at the front ends of the outer cable portions 6o and 7o of the first and second driven cables 6 and 7 are locked to a raised piece $35_2$ at a rear end of the relay support 59 and a raised piece $35_1$ at a front end of the relay support 59, respectively, and the inner cable portions 5i and 7i of the first and second driven cables 6 and 7 are slidably passed through an intermediate portion of the relay lever 33, and expanded terminals 37 and 39 are fixedly mounted at the front ends of the inner cable portions 6i and 7i and adapted to engage a front face and an end surface of the relay lever 33, respectively, when the relay lever 33 assumes the neutral position $N_2$.

A second return spring 62 is mounted to the pivot 61 for biasing the relay lever 33 for turning movement in a direction to pull the inner cable portion 5i, i.e., in the direction D.

The remaining construction is similar to that in the fourth embodiment shown in FIG. 11, wherein portions or components corresponding to those in the fourth embodiment are designated by like reference characters.

In this embodiment, the relay section 2 can be reduced in size by employing the relay lever 33 of a single arm type.

Figure 13:
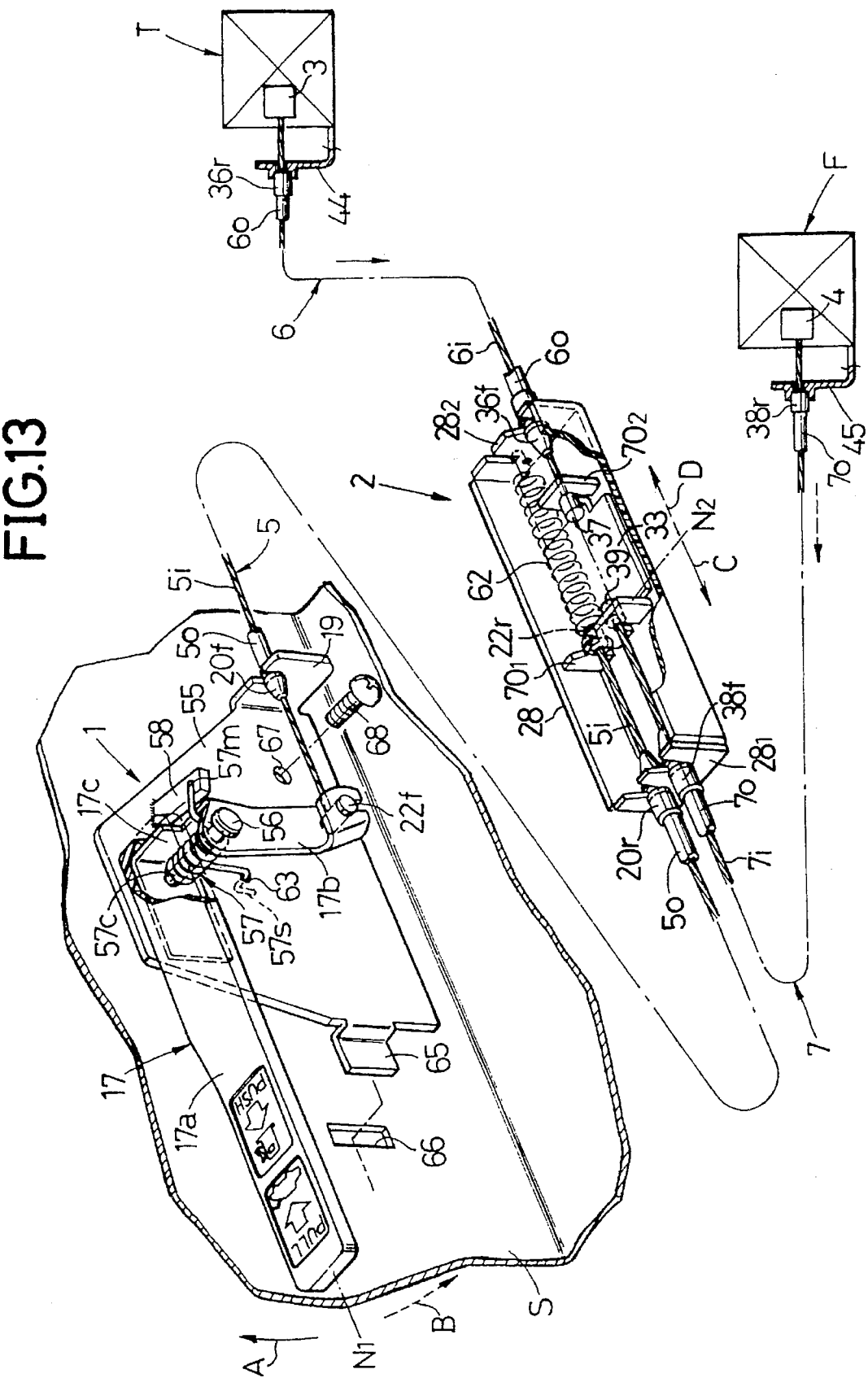
FIG. 13 is a perspective view of the entire structure of an operating system according to a sixth embodiment of the present invention.

FIG. 13 illustrates a sixth embodiment of the present invention. In a relay section 2, a relay casing 28 is formed into a box-like configuration longer in the longitudinal of the vehicle body. A relay operating member 33 is slidably accommodated in the relay casing 28 for sliding movement in the forward and rearward directions C and D from the neutral position $N_2$, and a second return spring 62 formed of a tension coil spring for biasing the relay operating member 33 rearwardly is connected between a rear end wall $28_2$ of the relay casing 28 and the relay operating member 33.

The end sleeve 20r at the rear end of the outer cable portion 5o of the driving cable 5 is locked to a front end wall $28_1$ of the relay casing 28, and the expanded terminal 22r at the rear end of the inner cable portion 5i of the driving cable 5 is connected to a raised piece $70_1$ of the relay operating member 33.

The end sleeves 36f and 38f at the front ends of the outer cable portions 6o and 7o of the first and second cables 6 and 7 are looked to the rear and front end walls $28_2$ and $28_1$ of the relay casing 28, respectively, and the inner cable portions 6i and 7i of the first and second driven cables 6 and 7 are slidably passed through a raised piece $70_2$ and the raised piece $70_1$ at the rear and front ends of the relay operating member 33, respectively. Expanded terminals 37 and 39 are fixedly mounted at the front ends of the inner cable portions 6i and 7i and adapted to engage a front surface of the raised piece $70_2$ at the rear end of the relay operating member 33 and a rear surface of the raised piece $70_1$ at the front end of the relay operating member 33, respectively, when the relay operating member 33 assumes the neutral position $N_2$.

The remaining construction is similar to that in the fourth embodiment shown in FIG. 11, wherein portions or components corresponding to those in the fourth embodiment are designated by like reference characters.

In this embodiment, a pivot 61 similar to that in the fourth embodiment is not required, which enables a simplification in structure.

Figure 14:
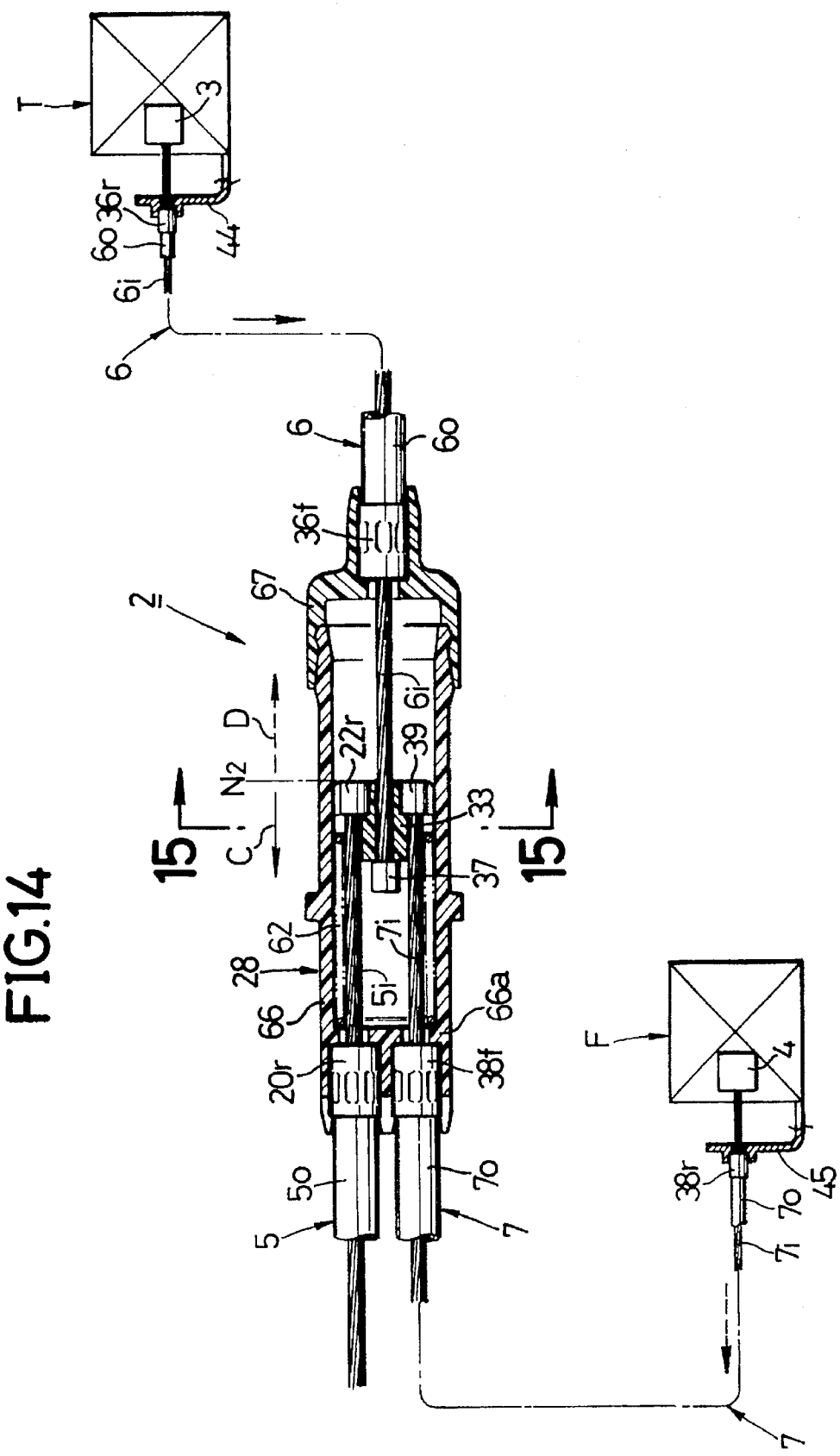
FIG. 14 is a longitudinal sectional side view of a relay section of an operating system according to a seventh embodiment of the present invention.
Figure 15:
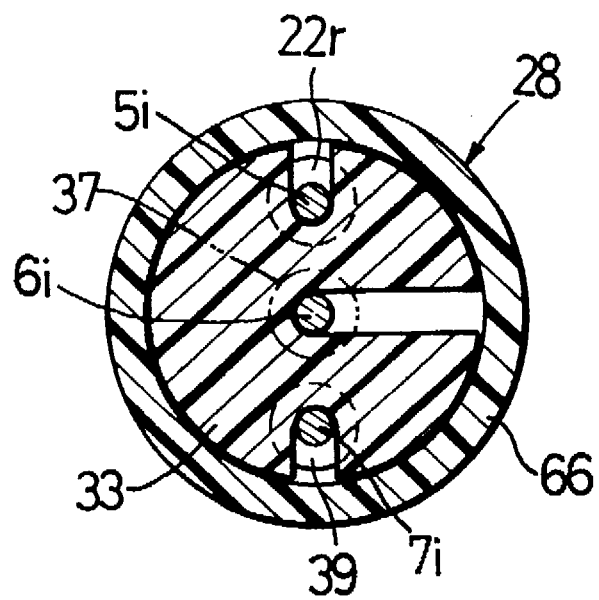
FIG. 15 is a sectional view taken along a line 15—15 in FIG. 14.

FIGS. 14 and 15 illustrate a seventh embodiment of the present invention. A relay casing 28 in a relay section 2 includes a cylindrical cylinder 66 of synthetic resin having a bottom wall 66a, and a cap 67 of synthetic resin resiliently fitted over an outer periphery of an open end of the cylinder 66 to close such open end. A relay operating member 33 in the form of a piston is slidably received in the cylinder 66 for sliding movement in the opposite directions C and D from a predetermined neutral position $N_2$. The end sleeve 20r at the rear end of the outer cable portion 5o of the driving cable 5 is locked to the bottom wall 66a of the cylinder 66, and the inner cable portion 5i of the driving cable 5 is passed through the relay operating member 33 and has an expanded terminal 22r engaged with the rear end thereof.

The end sleeves 36f and 38f at the front ends of the outer cable portions 6o and 7o of the first and second driven cables 6 and 7 are locked to the cap 67 and the bottom wall 66a of the cylinder 66, respectively, and the inner cable portions 6i and 7i of the first and second driven cables 6 and 7 are slidably passed through the relay operating member 33. Expanded terminals 37 and 39 are fixedly mounted at the front ends of the inner cable portions 6i and 7i and adapted to engage front and rear ends of the relay operating member 33, respectively, when the relay operating member 33 assumes the neutral position $N_2$.

A second return spring 62 for biasing the relay operating member 33 in the direction D is accommodated in the cylinder 66 to surround the inner cable portions 5i and 7i of the driving cable 5 and the second driven cable 7.

The remaining construction is similar to that in the fourth embodiment shown in FIG. 11, wherein portions or components corresponding to those in the fourth embodiment are designated by like reference characters.

In this embodiment, it is possible to provide a compact relay section 2.

Although the embodiments of the present invention have been described in detail, it will be understood that the present invention is not limited to these embodiment, and various modifications may be made without departing from the spirit and scope of the invention. For example, in the first embodiment, a usual Bowden cable can be used as the driving cable, and a return spring may be provided which is capable of operating the relay operating member 33 in the direction D when the Bowden cable has been loosed.

What is claimed is:

1. A system for independently operating first and second driven portions by a single operating member, said system comprising:

an operating member and a relay operating member which are interconnected through a driving cable for integral movement, such that said relay operating member is operated in opposite directions C and D from a second predetermined neutral position in operative association with said operating member operated in opposite directions A and B from a first predetermined neutral position;

first and second drive cables having inner cable portions slidably inserted through said relay operating member for sliding movement in the directions C and D;

a first expanded terminal mounted at one end of said inner cable portion of said first driven cable for engaging said relay operating member so as to pull the inner cable portion of the first driven cable when said relay operating member is operated in the direction C from the second neutral position; and a second expanded terminal mounted at one end of the inner cable portion of said second driven cable for engaging said relay operating member so as to pull the inner cable portion of said second driven cable when said relay operating member is operated in the direction D from the second neutral position, the other ends of said inner cable portions of said first and second driven cables being connected to said first and second driven portions, respectively, which are operated by pulling of said inner cable portions.

2. A system for independently operating first and second driven portions by a single operating member according to claim 1, wherein said driving cable is constructed into a push-pull type.

3. A system for independently operating first and second driven portions by a single operating member according to claim 1 or 2, further including biasing means connected to said operating member for biasing said operating member toward the first neutral position.

4. A system for independently operating first and second driven portions by a single operating member according to claim 1, further including a first return spring for applying a biasing force in one of opposite directions to said operating member, and a second return spring for applying a biasing force in the other of the opposite directions to said relay operating member so as to apply a tension to said driving cable, said second return spring having a preset load which is set such that either one of said first and second driven portions can be operated through said relay operating member, when said driving cable is loosed by the operation of said operating member, said first return spring having a preset load which is set larger than that of said second return spring, and a neutral stopper which is mounted on a support for supporting said operating member and which carries a movable end of said first return spring at the first predetermined neutral position of said operating member.

5. A system for independently operating first and second driven portions by a single operating member according to claim 1, 2, or 4, wherein said relay operating member is accommodated in a relay casing for sliding movement in the opposite directions C and D from the second predetermined neutral position, outer cable portions of said driving cable and said second driven cable being locked to one end of said relay casing, and an outer cable portion of said first driven cable being locked to the other end of said relay casing.

6. A system for independently operating first and second driven portions by a single operating member according to claim 1, 2, or 4, wherein said relay operating member comprises a swingable lever which is supported on a relay support for swinging movement in the opposite directions C and D from the second predetermined neutral position and which includes first and second arms extending in opposite directions, said expanded terminals at the inner cable portions of the first and second driven cables being locked to a same side of said first and second arms, and outer cable portions of said first and second driven cables being locked to ends of said relay support on a same side.

7. A system for independently operating first and second driven portions by a single operating member according to claim 1, 2, or 4, wherein said relay operating member comprises a lever which is supported at its one end on a relay support for swinging movement in the opposite directions C and D from the second predetermined neutral position, said expanded terminals at the inner cable portions of the first and second driven cables being locked to opposite sides of said relay operating member, and outer cable portions of said first and second driven cables being locked to opposite ends of said relay support.

8. A system for independently operating first and second driven portions by a single operating member according to claim 4, wherein said relay operating member is accommodated in a relay casing for sliding movement in the opposite directions C and D from the second predetermined neutral position, said relay operating member being formed, at opposite ends thereof in a sliding direction, with opposed raised pieces, said driving cable and the expanded terminals of the inner cable portion of said second driven cable being engaged with an inner side of one of said raised pieces, the expanded terminal of the inner cable portion of said first driven cable being engaged with an inner surface of the other raised piece, outer cable portions of said driving cable and said second driven cable being locked to one end of said relay casing, an outer cable portion of said first driven cable being locked to the other end of the relay casing, said second return spring for biasing said relay operating member in a direction to pull an inner cable portion of said driving cable being accommodated in said relay casing.

9. A system for independently operating first and second driven portions by a single operating member according to claim 4, wherein a relay casing comprises a cylinder having opposite end walls, and said relay operating member comprises a piston which is slidably received in said relay casing for sliding movement in the opposite directions C and D from the second predetermined neutral position, said driving cable and the expanded terminal of the inner cable portion of said second driven cable being engaged with one end face of said relay operating member, the expanded terminal of the inner cable portion of said first driven cable being engaged with the other end face of said relay operating member, outer cable portions of said driving cable and said second driven cable being locked to one end of said relay casing, an outer cable portion of said first driven cable being locked to the other end of the relay casing, said second return spring for biasing said relay operating member in a direction to pull an inner cable portion of said driving cable being accommodated in said relay casing to surround both the inner cable portions of said driving cable and said second driven cable.

10. A system for independently operating first and second driven portions by a single operating member according to claim 1, further including first and second return springs connected to said operating member and said relay operating member, respectively, for biasing said operating member and said relay operating member toward the first and second neutral positions, respectively, while applying a tension to said driving cable by cooperation with each other.

11. A system for independently operating first and second driven portions by a single operating member according to claim 1, 2, 4, 8 or 9, wherein one of said first and second driven portions is a lock-releasing portion in a trunk lid locking device for an automobile, and the other portion is a lock-releasing portion in a fuel lid locking device for said automobile.

* * * * *